United States Patent Office 2,892,381
Patented June 30, 1959

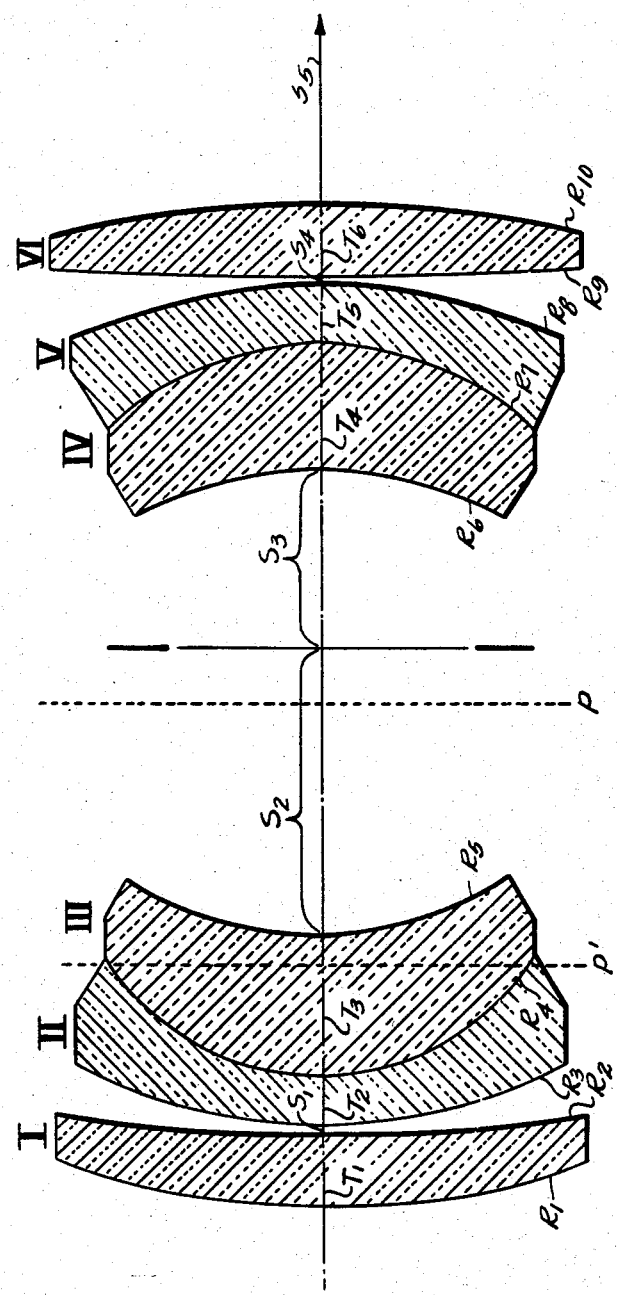

2,892,381
CORRECTED PHOTOGRAPHIC OBJECTIVE FOR NIGHT PHOTOGRAPHY

James G. Baker, Winchester, Mass., assignor to the United States of America as represented by the Secretary of the Air Force Application February 9, 1953, Serial No. 335,655

4 Claims. (Cl. 88—57)

This invention relates to optical objectives for aerial photography which are corrected for spherical and chromatic aberrations, coma, astigmatism, field curvature, and distortion and more particularly to a new kind of photographic objective of long focal length and large aperture, which is particularly adapted to night aerial photography, characterized not only by improved correction of all the ordinary aberrations but also by an improved correction of those three aberrations most injurious to systems of this kind. These three aberrations are higher order astigmatism, field curvature, and oblique spherical aberration.

This invention makes it possible to take aerial photographs at night by the use of flares which photographs are of large picture size of the order of 18 by 18 inches that are clear and bright with good definition throughout the full extent of the picture. In order to get such a large picture it is necessary to design a photographic objective with a long focal length and large free aperture which is accomplished in the objective of this invention wherein the focal length is 48 inches and the relative aperture is $f/4.5$. It was found expedient to use only three types of glass in the objective lens system of this invention and medium index glass is used in order to provide high efficiency in light transfer. From a practical standpoint higher index glass is limited in production diameter sizes which would necessitate making high index glass especially in large diameters to meet the diameter requirements of over twelve inches for the lenses used in this invention. The present invention using the medium index glass types brought forth a novel arrangement of elements and surface curves to provide a highly efficient photographic lens system to photograph substantially a full field of 30 degrees.

A great deal of difficulty is always experienced by the optical engineer in designing photographic lens systems of long focal length having a large relative aperture and wide field angle providing a large focal plane or format because of the difficulty in controlling all the optical corrections that in smaller lens systems are quite amenable to control. A small lens system of $f/4.5$, for example, need not worry one very much about the effects of oblique spherical aberration. Many small lens systems are afflicted by this aberration but in short focal lengths they perform satisfactorily. If a lens system of standard optical design and short focal length were scaled up to a system of long focal length, the optical aberrations would be so predominant as to prevent the achievement of a sharp image.

The lens system of the present invention is related to the Biotar type of lens system except that it has proved expedient to reverse the order of the hyperchromatic elements. In the ordinary Biotar type of lens system the central air space is relatively small compared to the focal length of the system and the adjacent concave surfaces are quite close together. This arrangement of surfaces is sure to cause severe oblique spherical aberration in large aperture, long focal length systems. The upper and lower rim rays are refracted in the overcorrected sense more and more drastically as the rays are inclined to the optical axis. At large off axis angles the oblique spherical aberration dominates and the image aberrations are severe. For this reason the standard Biotar lens system is limited to short focal lengths and limited fields although optical performance in portions of the field near the optical axis and on the optical axis is very good.

All of the advantages of the Biotar lens system have been utilized in the lens system of the present invention but in so doing a novel lens system has been created which provides a long focal length with large relative aperture and a large field angle to provide a large picture, yet minimizing oblique spherical aberration and controlling all other aberrations. In the present invention six lens elements in the form of a symmetrical system are positioned around a central stop. The individual negative meniscus components surrounding the central stop on either side are composed of two cemented elements with the index of refraction of the positive element being greater than that of the mating negative element and with the positive element adjacent to the central stop. This form of design means that the cemented surface is positively refracting; i.e., a lower rim ray is bent upwardly at the refraction of the first cemented surface and similarly, the upper rim ray is bent downwardly by refraction at the second cemented surface of the system. These refractions are of opposite sign to the refractions at the concave air surfaces, the primary source of the normal oblique spherical aberrations. The compensating effect of refraction at the cemented surfaces is much enhanced by increasing the large central air space. The center of curvature of each of the cemented surfaces lies on the same side of the stop as the surface itself. The large airspace tends also to diminish the amount of overcorrected oblique spherical aberration to be compensated. In the limit when the concave air surfaces are so far apart as to be concentric around a common center it is obvious that there will be no overcorrected oblique spherical aberration from these air surfaces whatsoever. In practice, the airspace cannot be increased to this amount because the lens system would lose power. Accordingly, there must be a compromise between diminishing the overcorrected oblique spherical aberration and compensating for other aberrations. Arranging the center of curvature of each cemented surface on the same side of the stop as the surface itself provides very strong compensating means for oblique spherical aberration. In order to utilize this compensation effectively a mean field angle and a mean ray of the aperture on the upper and lower side respectively to effect the correction are chosen. The correction is not complete for all parts of the aperture and the field at once and it is therefore necessary to choose mean points at which the aberration can be balanced. It is to be expected that in the innermost part of the field the negative oblique spherical aberration will dominate. In the outer part of the field beyond the mean rays chosen the oblique spherical aberration will return to undercorrection and the cemented surfaces will dominate.

The use of the cemented positive surfaces also helps to improve the optical correction on axis. Normally in most types of lens systems the axial performance is limited by the presence of zonal spherical aberration. This zonal spherical aberration arises from the interaction of power series terms of the third and fifth orders. The third order usually is undercorrected in order to compensate the normal over correction of the fifth and higher orders. In the system of the present invention, the cemented surfaces reverse the sign of the fifth and higher orders which become undercorrected. Accordingly, the third order aberration reverses sign and by a proper control of the amount of this reversed zonal spherical aberration the axial image is maintained in spite of the long focal length and a large relative aperture. The zonal spherical aberration of the present system lies only slightly outside of the Rayleigh limit in red light and as a result a sharp photographic axial image can be anticipated.

In the known photographic objectives of long focal lengths for night photography there is a substantial amount of vignetting. This vignetting lowers the illumination off the axis and as a result the effective speed of the lens as evaluated over the entire field is lowered. One of the difficulties in night photography is lack of adequate illumination. If the lens loses some of its illumination by vignetting, there is danger of considerable under exposure and loss of picture quality. If vignetting were to be reduced in the known objectives, the extra rays of light now reaching the focal plane would be very imperfectly corrected and the images would deteriorate. In the present invention, where the oblique spherical aberration has been compensated, the vignetting can be reduced without harm. The off axis images maintain their sharpness in spite of the greater brightness.

Another aberration which affects the performance of known objectives of long focal lengths and speed of $f/4.5$ is the appearance of higher order astigmatism. In the outer part of the field one encounters a departure from both flatness of field and from astigmatic image where the two astigmatic surfaces are undergoing strong zonal tendencies. In many cases the higher order tangential astigmatism shows distinct undercorrection far off the optical axis where the amplitude of the focal error from a flat image plane may amount to three millimeters or more. Similarly the radial image surface may depart also from the flat image plane and show amplitudes of the order of one millimeter or more. At $f/4.5$ the tolerance on focal depth is small. In the present invention the calculated radial astigmatism amounts to less than one half of a millimeter focal error all the way to the edge of the focal plane or format. The radial surface has been left somewhat undercorrected in order to anticipate overcorrection in the skew rays in the sagittal direction. In the tangential direction the limiting tangential astigmatism must be considered in combination with residual coma and higher order symmetrical and asymmetrical errors in the aperture, including residual oblique spherical aberration. The mean focus where all of these errors are considered lies on a flat image plane all the way to the edge of the format, within one millimeter. This residual astigmatism is partly obscured by the presence of secondary spectrum even in the limited spectral range considered. This inevitable secondary spectrum means that some one color will at all times be in focus. That is, if the photographic emulsion lies one millimeter from the ideal plane, then some one color out of focus by one millimeter will focus sharply on the emulsion. If the photographic emulsion is focused at some other point, some other color will be in sharp focus on the emulsion. This secondary spectrum actually aids the depth of focus while lowering the peak of resolution. Under conditions of night photography where contrast is poor because of haze and when illumination is often on the under exposure side, a high peak of resolution cannot be anticipated anyway.

The lens system of the present invention has been corrected for chromatic aberrations for a limited spectral range. As hereinbefore stated the lens system is particularly adapted for night photography using a red or infrared filter and consequently only a limited spectral range is anticipated. The present objective lens system is well corrected for chromatic spherical aberrations in the wave length range from 6000 angstroms to 9000 angstroms.

The present invention is illustrated by an example shown in the single figure of the drawing which includes the structural data thereof.

In the example shown in the single figure, the lens system has an equivalent focal length of 48 inches, relative aperture of $f/4.5$, and a full field angle of about 30 degrees which produces a focal plane or format of 18 by 18 inches.

The notation is that the successive radii of curvature, counting from the front of the system, are $R_1$, $R_2$, etc., the absence of any sign preceding the number indicating that the number is positive in which the curve is convex toward the front of the system and the $(-)$ sign denoting the curve is concave toward the same. The axial thicknesses of the elements are represented by $T_1$, $T_2$, etc., and the element separations are given as $S_1$, $S_2$, $S_3$, etc. The material is defined in terms of the mean refractive index represented by $N_D$ as conventionally employed, and the dispersion values of the material is indicated by the Abbe V numbers. The structural description of an illustration of the invention is given numerically below wherein the elements from the front of the system to the rear are identified by I, II, III, etc.

| Element | Radii (inches) | Thickness (inches) | Space (inches) | $N_D$ | Abbe V |
|---------|---------------|--------------------|----------------|-------|--------|
| I       | $R_1 = 17.385$ | $T_1=1.679$       | $S_1= 0.148$   | 1.61272 | 58.6 |
|         | $R_2 = 40.442$ |                    |                |         |      |
| II      | $R_3 = 11.737$ | $T_2=1.232$       |                | 1.60565 | 37.9 |
|         | $R_4 = 5.799$  |                    |                |         |      |
| III     | $R_5 = 8.454$  | $T_3=3.204$       |                | 1.62041 | 60.3 |
|         |                |                    | $S_2= 6.774$   |         |      |
|         |                |                    | Stop           |         |      |
|         |                |                    | $S_3= 4.071$   |         |      |
| IV      | $R_6 = -9.301$ | $T_4=2.958$       |                | 1.62041 | 60.3 |
|         | $R_7 = -6.345$ |                    |                |         |      |
| V       | $R_8 = -13.827$ | $T_5=1.371$      |                | 1.60565 | 37.9 |
|         | $R_9 = 410.78$ |                    | $S_4= 0.148$   |         |      |
| VI      |                | $T_6=1.725$       |                | 1.60565 | 37.9 |
|         | $R_{10}= -30.095$ |                 | $S_5=30.395$   |         |      |

It is the usual practice among optical engineers to use design specifications with reference to unit focal length. To aid the optical engineer with the more conventional optical notations, the optical data corresponding to the single figure of the drawing are given below in terms of the equivalent focal length of the objective taken as unity. The index of refraction and Abbe V numbers being the same as in the above chart will not be repeated below.

| Element | Radii | Thickness | Space |
|---------|-------|-----------|-------|
| I       | $R_1 = 0.362$ | $T_1=0.035$ | |
|         | $R_2 = 0.843$ |             | $S_1=0.003$ |
| II      | $R_3 = 0.245$ | $T_2=0.026$ | |
|         | $R_4 = 0.121$ |             | |
| III     | $R_5 = 0.176$ | $T_3=0.067$ | |
|         |               | Stop        | $S_2+S_3=0.226$ |
| IV      | $R_6 = -0.194$ | $T_4=0.062$ | |
|         | $R_7 = -0.132$ |             | |
| V       | $R_8 = -0.288$ | $T_5=0.029$ | |
|         |                |             | $S_4=0.003$ |
| VI      | $R_9 = 8.56$   | $T_6=0.036$ | |
|         | $R_{10}=-0.627$ |            | $S_5=0.633$ |

From the above description it may be understood, as shown in the drawing, that the second principal plane, P', is established forward of the center of the lens system through the element III and the first principal plane P, is established in the airspace between the lens components slightly forward of the stop and close to the center of the two lens components proper.

The first element I in the example is a kind of dense barium crown glass which is known to resist tarnishing somewhat better than other barium crown glasses of the same refractive index. It has also been found expedient to use a weak meniscus positive element for the front of the system as is usual of practically all lens systems of this type. In general this first element I should be of a type of glass of high index of refraction $N_D$ and of high Abbe V value. The highest index available among the glasses with enhanced dispersion Abbe V value for the index has the approximate value of 1.75 with a dispersion of 45.7. Such a high index would be suitable for lenses of short focal length, but for larger focal lengths would lead to considerable absorption of light. Accordingly, the refractive index of 1.75 is considered as an upper limit to the useful glass types for element I of this lens system, but for the longer focal length it has been found best to use glass types with refractive indices ranging from 1.58 to 1.63. Such glasses are manufactured in large diameters and are relatively free of absorption and color. The corresponding dispersion Abbe V value for such glasses generally lies in the range from 55 to 62 and these values have been found satisfactory although the dispersion value of 45 for the above mentioned glass of index value of 1.75 is considered satisfactory as the lower limit in the present lens system.

In order to obtain compensation for the oblique spherical aberration, as described above, certain elements in the cemented doublets have been found necessary. There must be an index rise in the refraction across the cemented surface. In order to effect the color correction of the overall system simultaneously, a doublet must be used where the Abbe V values are related to the steepness of the cemented curves and to the index rise across the cemented surface. These conditions are satisfied sufficiently well by the use of a properly selected flint glass for elements II and V cemented respectively to elements III and IV of dense barium crown glass of higher index. For smaller lens systems it would be preferable to employ a glass of still higher index and the apparent limitation in this respect may be 1.75. In the present invention the ranges of index are not so important as the criterion that there be an appropriate rise in index across the cemented surfaces for either negative doublet. It has been found by extensive calculations that the index rise lies in the range of .010 to .035. If the index rise across the cemented surface were much smaller than .010, the cemented surface would have to have a much shorter radius and accordingly the oblique spherical aberration would be adversely affected. If the index rise were much greater than .035, either the curve of the cemented surface would have to be shallow to effect correction for oblique spherical aberration, in which case the chromatic aberration would probably not be corrected, or else the curve would be strong enough to correct the color aberration in which case there would be considerable positive undercorrection for oblique spherical aberration. Very good results are obtained where this index rise is .014 as illustrated in the drawing.

In order to effect color correction for a reasonable curve for the cemented surface, it is found necessary to have a certain minimum difference to the Abbe V values of these cemented elements. As shown in the drawing, the difference in the V value for the illustrated lens system amounts to 22.4. It has been found by calculation that the difference in the V values of these cemented elements II and III or IV and V should lie in the range from 18 to 30. If the difference were much smaller than 18, it would be necessary to employ a much steeper curve for the cemented surface to bring about color correction and this would have an adverse effect on the oblique spherical aberration. If the difference of the V values were much larger than 30, the cemented curve would be less steep to bring about the chromatic aberration in which case the curvature would be insufficient to correct oblique spherical aberration at the same time.

In both of the ranges of index and V values as disclosed, supra, lens systems can be designed substantially with all the advantage of the specific illustrated lens system shown in the drawing without departing from the spirit of this invention. Lenses outside this range would necessarily suffer from inadequate color correction or from inadequate correction for oblique spherical aberration and would therefore be restricted to shorter focal lengths and to smaller fields.

In order to correct the optical system of the present invention for distortion, where the strong cemented doublets have already been balanced for coma for an infinite object, it is necessary to combine the curvatures, glass types, and lens powers in the proper way. When this is accomplished it is found that the glass type for the rear element VI can be the same as for the two negative elements III and IV of the system. According to the parameters of the design, the dispersion value for element VI lies in the range between 35 and 55. If the dispersion value were less than 35, it would be impossible to correct the entire lens system for longitudinal color in the illustration shown; and if the dispersion value were greater than 55, the system would be necessarily overcorrected for longitudinal color. It was found in the lens system illustrated in the drawing that the dispersion value of 37.9 is desirable for the large size lenses used. For smaller lenses, where other types of glass can be combined in the negative meniscus doublets according to the disclosure above, the range of dispersion values of the element VI will indeed vary over the stated range of 35 to 55. At the same time, the index of refraction may usefully vary between the range of 1.58 and 1.75. In general, the higher the index of refraction for the rear element, the better the over-all effect on the Petzval sum and other aberrations of the system. In the large lens of the system shown in the drawing, use of a very high index was avoided because of the great expense, unavailability, and transmission losses of the heavier types of glass.

The radii shown in the figure of the drawing and herein above illustrate the lens system but these radii may be varied within certain limits with respect to the focal length of the system without departing from the scope of the invention. The radius of curvature of the first cemented surface $R_4$ amounts of .12 of the focal length of the system. If the radius is much steeper, the color correction will be overdone and the correction for oblique spherical aberration will be too great. If the radius of curvature $R_4$ becomes too long, the correction for oblique spherical aberration will be insufficient and the color correction will be insufficient. It has been found that if the radius $R_4$ be kept within the limits of .10 to .17 of the focal length of the system, the aberrations can be controlled and an objective lens system of long focal length and large free aperture within the scope of this invention will be maintained. The radius of curvature $R_7$ is .132 of the focal length of the system. By the same reasoning as used with respect to the surface $R_4$, the limits of the radius of curvature $R_7$ are found to be from .11 to .16 of the focal length of the system in which range the objective lens system remains within the scope of the invention.

The radius of curvature $R_2$ of the system amounts to .843 of the focal length of the system. If this lens element were more steeply curved, the spherical aberration would be increased without adequate means for compensation. It should be noted in a lense design of this kind that the only source of correction of the spherical aberration arises from the fifth and sixth surfaces $R_5$ and $R_6$, the only negative refracting surfaces of the system. Accordingly, it is important that the positive spherical aberration introduced by each surface elsewhere be kept to a minimum. If this is not done, the negative surfaces become too steep and it becomes impossible to correct the system for oblique spherical aberration, and too, zonal spherical aberration on axis gets out of control. The upper limit to bending the first element, which is therefore reflected in the radius of curvature $R_2$, is restricted. If the first element is bent less than shown and described, resulting in a longer radius in the surface $R_2$, the system will show too much positive astigmatism of the third order which again cannot be adequately compensated without distorting characteristics of the rest of the system. The surface $R_2$ has therefore been found to lie in the range from .6 to two times the focal length of the system without detracting from the lens system comprising the invention. The radius of curvature $R_9$ has limitations with respect to the focal length of the system corresponding to those of $R_2$, but the range in the case of $R_9$ extends from twice the focal length of the system to infinity or plano.

As hereinbefore stated the objective lens system of this invention was particularly designed for use within a restricted range of the spectrum and was therefore to have an optical filter incorporated therein. Most aerial photography is carried on in the yellow, red, and infrared portions of the spectrum. Restriction to this fairly narrow portion of the spectrum is accomplished by the use of optical filters. The red, and especially the infrared, are used for penetrating through atmospheric haze. In night photography, atmospheric haze can be particularly damaging to picture quality. The haze directly beneath the airplane is illuminated by the night flash bomb and the stray light is scattered directly onto the photograph. By resorting to the red or to the infrared, the haze from dust particles and from water droplets that are large enough can be minimized. Most of the haze arises normally from atmospheric moisture in the form of small droplets which yield a whitish reflection. In such a haze condition the use of the red and infrared accomplishes only minor improvement. In spite of this it has proved worthwhile in practice to use red and infrared filters for haze penetration and the restriction of the color by means of filters helps the optical performance. Aberrations that vary rapidly with color are minimized. Moreover, a type of lens design can be chosen where the color variations are relatively large, provided the monochromatic corrections are improved or simplicity of the system is obtained. The filter of the objective lens system shown and described herein may be placed in the system in the conventional manner but it has been found best to avoid any change in optical constants to place an optical filter coating, as by evaporation processes well known in the art, on the surface $R_6$ of the lens system.

It may be noted that in the actual practice of the photographic objective disclosed herein the lens system may be mounted so that element VI could be adjustable along the axis toward and away from the element V to accommodate for all anticipated focal changes. The axial adjustment of element VI over the range $S_4$ provides for all the focal ranges expected in aerial photography.

What I claim as my invention and desire to secure by Letters Patent is:

1. An aerial photoghaphic objective of long focal length and large relative aperture comprising: a substantially axially aligned symmetrical six element lens system having two components axially airspaced on opposite sides of a central stop with opposed negative refractive oppositely curved surfaces for minimizing spherical aberration, each said component consisting of a weak positive element slightly airspaced from a negative meniscus doublet of a negative element and a positive element progressively in the order named toward the center of said system, the third and fourth elements having the same index of refraction and dispersion value and the second, fifth, and sixth elements having the same index of refraction and dispersion value, said weak positive front element having a radius of curvature of the second surface thereof not less than .6 or more than 2 times the focal length of the system; said doublets each having a cemented surface the radius of curvature of which is not less than .11 F or more than .16 F, where F is the focal length of the system, the cemented surfaces being separated by more than the sum of said radii of curvature, the positive element of said doublets having an index of refraction greater than the negative element thereof by not less than .010 or more than .035 and a dispersion value differing by not less than 18 or more than 30, whereby said lens system is corrected for spherical and chromatic aberrations, coma, astigmatism, field curvature, and distortion.

2. An aerial photographic objective as set forth in claim 1 wherein the first element has an index of refraction in the range of 1.58 to 1.75 and a dispersion value in the range of 45 to 62.

3. An aerial photographic objective for night photography having an equivalent focal length of unity with a relative aperture of $f/4.5$ substantially according to the following specifications in which $R_1$, $R_2$, etc., represent the radii of curvature of the elements relative to the equivalent focal length beginning from the front of the system wherein all positive numbers represent the curvature as being convex toward the front of the system and a negative (—) sign denotes the surface is concave thereto; $T_1$, $T_2$, etc., represent the axial thicknesses of the lens elements relative to the equivalent focal length; $S_1$, $S_2$, etc., denote the axial airspace between the system elements relative to the equivalent focal length; $N_D$ represents the index of refraction; Abbe V represents the dispersion value; and I, II, etc., identifies the lens elements:

| Element | Radii (inches) | Thickness (inches) | Space (inches) | $N_D$ | Abbe V |
|---|---|---|---|---|---|
| I | $R_1=0.362$ | $T_1=0.035$ | | 1.61272 | 58.6 |
|   | $R_2=0.843$ | | $S_1=0.003$ | | |
| II | $R_3=0.245$ | $T_2=0.026$ | | 1.60565 | 37.9 |
| III | $R_4=0.121$ | $T_3=0.067$ | | 1.62041 | 60.3 |
|    | $R_5=0.176$ | | $S_2+S_3=0.226$ Stop | | |
| IV | $R_6=-0.194$ | $T_4=0.062$ | | 1.62041 | 60.3 |
|    | $R_7=-0.132$ | | | | |
| V | $R_8=-0.288$ | $T_5=0.029$ | | 1.60565 | 37.9 |
|   | | | $S_4=0.003$ | | |
| VI | $R_9=8.56$ | $T_6=0.036$ | | 1.60565 | 37.9 |
|    | $R_{10}=-0.627$ | | $S_5=0.633$ | | |

4. A photographic objective for night photography with an equivalent focal length of about four feet, a full field angle of about 30° and a focal plane of about 18 inches square, comprising six lens elements grouped in sets of three on opposite sides of a stop and having physical dimensions and characteristics shown in the chart below wherein the lens elements are indicated by Roman numerals increasing from the front of the objective, the lens radii are designated by the letter R, the axial thickness of the lens elements are designated by the letter T, the space separating the lens elements are indicated by the letter S, wherein $N_D$ indicates mean refractive index and wherein Abbe V indicates dispersion values of the lens elements, wherein the order of the lenses begins with the front of the objective toward which a convex lens surface radius dimension is preceded with a plus symbol and a concave surface radius dimension is preceded with a minus symbol, where the lens elements I, III, IV and VI are of a dense barium crown glass, and the lens elements II and V are flint, and wherein the values of the six lens elements are:

| Element | Radii (inches) | Thickness (inches) | Space (inches) | $N_D$ | Abbe V |
|---|---|---|---|---|---|
| I | $R_1=17.385$ | $T_1=1.679$ | | 1.61272 | 58.6 |
| | $R_2=40.442$ | | $S_1=0.148$ | | |
| II | $R_3=11.737$ | $T_2=1.232$ | | 1.60565 | 37.9 |
| III | $R_4=5.799$ | $T_3=3.204$ | | 1.62041 | 60.3 |
| | $R_5=8.454$ | | $S_2=6.774$ Stop $S_3=4.071$ | | |
| IV | $R_6=-9.301$ | $T_4=2.958$ | | 1.62041 | 60.3 |
| V | $R_7=-6.345$ | $T_5=1.371$ | | 1.60565 | 37.9 |
| | $R_8=-13.827$ | | $S_4=0.148$ | | |
| VI | $R_9=410.78$ | $T_6=1.725$ | | 1.60565 | 37.9 |
| | $R_{10}=-30.095$ | | $S_5=30.395$ | | |

References Cited in the file of this patent
UNITED STATES PATENTS

| | | |
|---|---|---|
| 1,910,492 | Mellor | May 23, 1933 |
| 2,373,815 | Del Riccio | Apr. 17, 1945 |
| 2,389,016 | Wynne | Nov. 13, 1945 |
| 2,511,517 | Spiegel | June 13, 1950 |
| 2,512,153 | Henzey et al. | June 20, 1950 |
| 2,575,020 | Lee et al. | Nov. 13, 1951 |
| 2,734,423 | Bertele | Feb. 14, 1956 |

FOREIGN PATENTS

| | | |
|---|---|---|
| 612,474 | Great Britain | Nov. 12, 1948 |